United States Patent [19]

Lachmann et al.

[11] Patent Number: 5,084,674
[45] Date of Patent: Jan. 28, 1992

[54] CIRCUIT CONFIGURATION HAVING A PAIR OF MULTI-HALL GENERATOR HALL SENSORS AND HIGH PASS FILTER FOR CONTACTLESS DETECTION OF THE RPM OF A ROTATING GEAR WHEEL

[75] Inventors: Ulrich Lachmann, Munich; Hartmut Jasberg, Ottobrunn, both of Fed. Rep. of Germany

[73] Assignee: Siemens Aktiengesellschaft, Munich, Fed. Rep. of Germany

[21] Appl. No.: 420,338

[22] Filed: Oct. 12, 1989

[30] Foreign Application Priority Data

Oct. 13, 1988 [EP] European Pat. Off. ........ 88117054.2

[51] Int. Cl.⁵ .................. G01P 3/44; G01P 3/488; G01R 33/06; H01L 27/22
[52] U.S. Cl. .................. 324/174; 307/309; 324/166; 324/225; 324/251; 328/167
[58] Field of Search ............ 338/32 H; 307/309; 328/167; 73/518, 519; 324/160, 463, 166, 173, 174, 207.20, 207.21, 207.25, 225, 251

[56] References Cited

U.S. PATENT DOCUMENTS

| | | | |
|---|---|---|---|
| 3,636,767 | 1/1972 | Duffy | 324/174 |
| 4,093,917 | 6/1978 | Haeussermann | 324/173 |
| 4,369,405 | 1/1983 | Sato et al. | 324/174 |
| 4,518,918 | 5/1985 | Avery . | |
| 4,737,710 | 4/1988 | Van Antwerp et al. | 324/207.2 |
| 4,818,939 | 4/1989 | Takahashi et al. | 324/173 X |
| 4,859,941 | 8/1989 | Higgs et al. | 324/251 X |
| 4,875,011 | 10/1989 | Namiki et al. | 324/251 |
| 4,914,387 | 4/1990 | Santos | 324/174 |

FOREIGN PATENT DOCUMENTS

| | | |
|---|---|---|
| 0044047 | 1/1982 | European Pat. Off. . |
| 3026226 | 5/1982 | Fed. Rep. of Germany . |
| 2107470 | 4/1983 | United Kingdom ............ 324/173 |
| 2176616 | 12/1986 | United Kingdom . |

OTHER PUBLICATIONS

Publication by Ulrich von Borcke, entitled "Feldplatten-Differentialfühler FP210", Siemens Component Information Manual 10 (1972 No. 5, pp. 129-132.
Publication by Hans A. Cuno, entitled "Einfache Berechnung von Feldplattendaten in Abhängigket von Magnetfeld und Temperatur", Siemend Component Report 14 (1976), pp. 89-93.

Primary Examiner—Gerard R. Strecker
Attorney, Agent, or Firm—Herbert L. Lerner; Laurence A. Greenberg

[57] ABSTRACT

A circuit configuration for contactless detection of the rpm of a rotating gear wheel includes two identical firmly mounted and magnetically prestressed Hall sensors being mutually spaced apart by a center distance equal to one-half the tooth pitch of a gear wheel whose rpm is to be detected. Each of the Hall sensors includes at least one pair of identical Hall generators having signal paths and being driven with an impressed control current or impressed control voltage. Voltage/current converters are each coupled to the signal path of a respective one of the Hall generators and each have an output. An evaluation circuit links together the outputs of the voltage/current converters connected to one of the Hall sensors and the outputs of the voltage/current converters connected to the other of the Hall sensors in phase opposition.

4 Claims, 2 Drawing Sheets

CIRCUIT CONFIGURATION HAVING A PAIR OF MULTI-HALL GENERATOR HALL SENSORS AND HIGH PASS FILTER FOR CONTACTLESS DETECTION OF THE RPM OF A ROTATING GEAR WHEEL

The invention relates to a configuration for contactless detection of the rpm of a rotating gear wheel by means of two identical, firmly mounted and magnetically prestressed Hall sensors, each having at least one pair of identical Hall generators driven with an impressed control current or impressed control voltage and having voltage/current converters coupled to the respective signal paths of the Hall generators, the outputs of the converters being linked to one another by means of an evaluation circuit.

As is already known, for instance, from the publication by Ulrich von Borcke, entitled Feldplatten-Differentialfuhler [Magnetoresistor Differential Sensors] FP 210, Siemens-Bauteile-Informationen [Siemens Component Informational Manual] 10 (1972), No. 5, pp. 129-132 and the publication by Hans A. Cuno, entitled Einfache Berechnung von Feldplatten in Abhangigkeit von Magnetfeld und Temperatur [Simple Calculation of Magnetoresistors as a Function of Magnetic Field and Temperature], Siemens-Bauteile Report [Siemens Component Report] 14 (1976), No. 3, pp. 89-93, magnetoresistors being formed of magnetically sensitive semiconductor material prestressed by a permanent magnet are used to measure the rpm of a gear wheel. The magnetoresistors are mounted firmly facing the end surface of the rotating gear wheel, and are spaced apart from one another by a distance equal to approximately half the tooth pitch of the gear wheel. The result in both magnetoresistors is useful signals generated by the rotating gear wheel, which are phase-offset from one another by approximately 180°. On the other hand, noise fields and temperature fluctuations, for instance, cause in-phase disturbance signals in both magnetoresistors. By subtracting the signals originating in the two magneto- resistors, the disturbance signals are damped and the useful signals are amplified. This operation, also known as common mode rejection, damps external disturbances that simultaneously act on both magnetoresistors at a magnetoresistor differential sensor. In contrast, disturbances not originating in the magnetoresistors themselves, are undiminished.

German Patent DE-PS 30 26 226 describes a configuration for increasing the evaluatable useful signal in a magnetic field pickup based on the Hall principle. Such semiconductor-based pickups, known as Hall sensors, are each made up of at least one Hall generator operated with an impressed control current and one voltage/current converter coupled to the Hall signal path of the Hall generator. The outputs of the voltage/current converters are joined in phase with one another. Connecting n Hall generators together increases the useful signal n times, while uncorrelated disturbance signals, such as noise, decrease by the root of the n multiple, resulting in a more favorable signal-to-noise ratio. Nevertheless, the influence of external disturbance variables such as temperature fluctuations or noise fields remains undiminished.

It is accordingly an object of the invention to provide a configuration for contactless detection of the rpm of a rotating gear wheel, which overcomes the hereinaforementioned disadvantages of the heretofore-known devices of this general type and which has a higher signal-to-noise ratio.

With the foregoing and other objects in view there is provided, in accordance with the invention, a circuit configuration for contactless detection of the rpm of a rotating gear wheel, comprising two identical firmly mounted and magnetically prestressed Hall sensors being mutually spaced apart by a center distance equal to one-half the tooth pitch of a gear wheel whose rpm is to be detected, each of the Hall sensors including at least one pair of identical Hall generators having signal paths and being driven with an impressed control current or impressed control voltage, voltage/current converters each being coupled to the signal path of a respective one of the Hall generators and each having an output, and an evaluation circuit linking together the outputs of the voltage/current converters connected to one of the Hall sensors and the outputs of the voltage/current converters connected to the other of the Hall sensors in phase opposition.

One advantage of the invention is that both disturbance signals originating externally and those originating in the configuration itself are damped in proportion to the useful signals.

In accordance with another feature of the invention, the Hall generators of each of the Hall sensors are rotated through 90° relative to each another.

In accordance with an added feature of the invention, the voltage/current converters are differential amplifiers with output branches carrying signal currents of opposed phase relation, and the output branches of the differential amplifiers of one of the Hall sensors carrying signal currents of the same phase relation and the output branches of the differential amplifiers of the other of the Hall sensors carrying signal currents of opposed phase relation being joined together and connected to the evaluation circuit.

In accordance with an additional feature of the invention, the evaluation circuit includes a comparator with switching hysteresis.

In accordance with a further feature of the invention, there is provided a high-pass filter connected upstream of the comparator with switching hysteresis.

In accordance with yet another feature of the invention, the high-pass filter includes an operational amplifier having an inverting input, a non-inverting input and an output, a reference voltage source connecting the inverting input to zero potential, two controllable current impressing means connected to the non-inverting input, one of the current impressing means being connected to a supply potential and being acted upon by an output signal of the voltage/current converters, the other of the current impressing means being at zero potential and being acted upon by a signal present at the output of the operational amplifier, a capacitor connected between the non-inverting input of the operational amplifier and the zero potential, and the difference between the signal at the output of the operational amplifier and the output signal of the voltage/current converters forming an output signal of the high-pass filter.

In accordance with a concomitant feature of the invention, there is provided a trigger circuit for the Hall sensors, the Hall sensors, the evaluation circuit and the trigger circuit being joined together into an integrated circuit.

Other features which are considered as characteristic for the invention are set forth in the appended claims.

Although the invention is illustrated and described herein as embodied in a configuration for contactless detection of the rpm of a rotating gear wheel, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

Figure 1:
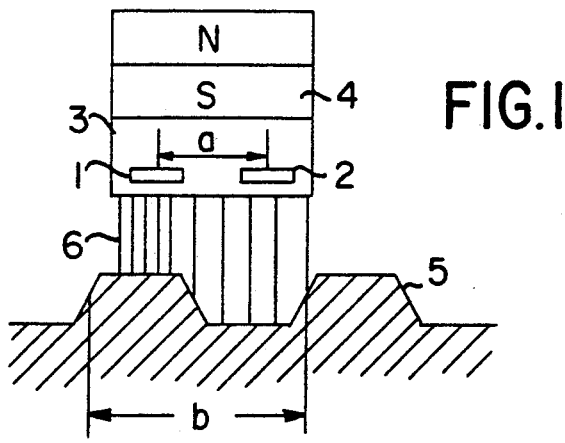
FIG. 1 is a fragmentary, diagrammatic, cross-section sketch showing the mechanical layout of a basic embodiment of a configuration according to the invention.

Referring now to the figures of the drawing in detail and first, particularly, to FIG. 1 thereof, there is seen a configuration according to the invention in which two identical Hall sensors 1, 2 which are mutually spaced apart center-to-center by a distance a and are joined with a trigger circuit and an evaluation circuit to make an integrated circuit 3. The Hall sensors 1, 2 are magnetically prestressed by a permanent magnet 4 as a result of the orientation of one pole S of the permanent magnet 4 toward the integrated circuit 3 and of the other pole N away from the integrated circuit 3. A rotating gear wheel 5 faces the secured configuration of the permanent magnet 4 and the integrated circuit 3, and is mounted in such a way that the end surface of the gear wheel 5 is parallel to the two Hall sensors and the teeth of the gear wheel 5 moving from one Hall sensor to the other move past the integrated circuit 3 at a predetermined distance. The spacing between two teeth, which will be referred to as the tooth pitch b below, is dimensioned in such a way that it is equivalent to twice the center distance a of the two Hall sensors 1, 2. A magnetic field which occurs between the permanent magnet 4 and the gear wheel 5 and also penetrates the integrated circuit 3, is represented in the drawing by field lines 6 and is influenced by the rotating gear wheel in such a way that contrary flux changes in the two Hall sensors 1, 2 are produced. The result is useful signals in the two Hall sensors 1, 2 that are phase-offset from one another by 180°. A corresponding mechanical layout is known, for instance, from a publication by Ulrich von Borcke, entitled Feldplatten-Differentialfuhler [Magnetoresistor Differential Sensors] FP 210, Siemens-Bauteile-Informationen [Siemens Component Informational Manual] 10 (1972), No. 5, pp. 129-132 and the publication by Hans A. Cuno, entitled Einfache Berechnung von Feldplatten in Abhangigkeit von Magnetfeld und Temperatur [Simple Calculation of Magnetoresistors as a Function of Magnetic Field and Temperature], Siemens Bauteile Report [Siemens Component Report] 14 (1976), No. 3, pp. 89-93, for magnetoresistors operated as a differential circuit.

Figure 2:
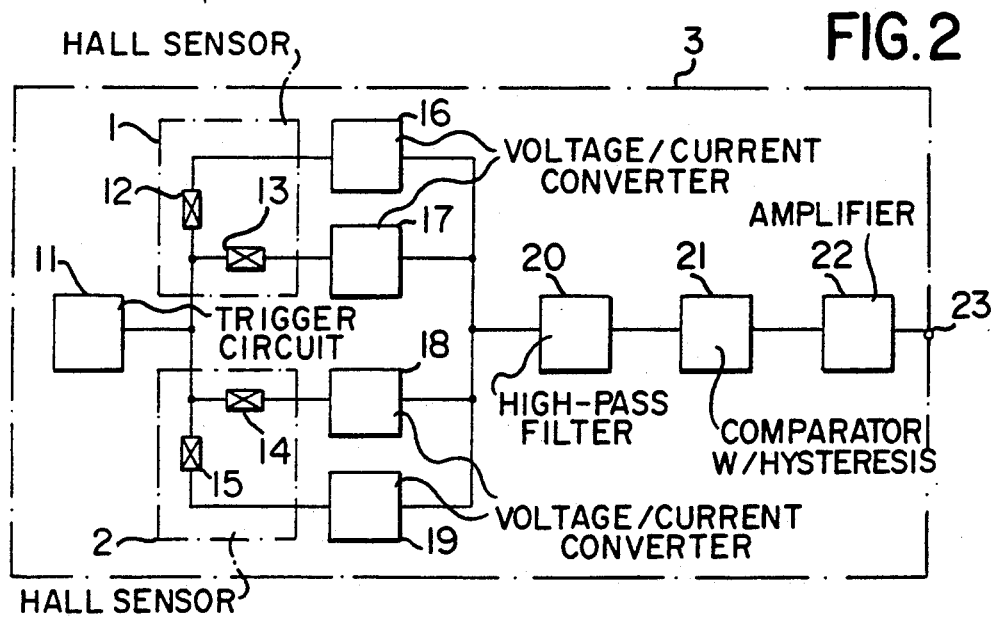
FIG. 2 is a block circuit diagram of a basic embodiment of a configuration according to the invention.

In a basic embodiment shown in FIG. 2, the two identical Hall sensors 1, 2 each include two identical Hall generators 12, 13 and 14, 15 which are, for instance, supplied from common control current impressing means in the form of a trigger circuit 11. Supply of the Hall sensors 1, 2 by common control voltage impression is provided as an alternative according to the invention. Voltage/current converters 16, 17, 18, 19 are respectively coupled to the Hall signals paths of the four Hall generators 12, 13, 14, 15, they have outputs which are joined together and, according to a further feature of the invention, they are connected to a high-pass filter 20. Connected to the output side of the high-pass filter 20 is a comparator 21 with hysteresis, followed by an amplifier 22 having an output which is provided as an output 23 of the entire configuration that is combined into the integrated circuit 3. The two Hall sensors 1, 2 are operated as a differential circuit, so that the difference between the signals originating in the two Hall sensors 1, 2 is present at the input of the high-pass filter 20. This doubles the amplitude of the useful signal, while suppressing unwanted signals that act simultaneously on both Hall sensors.

Figure 3:
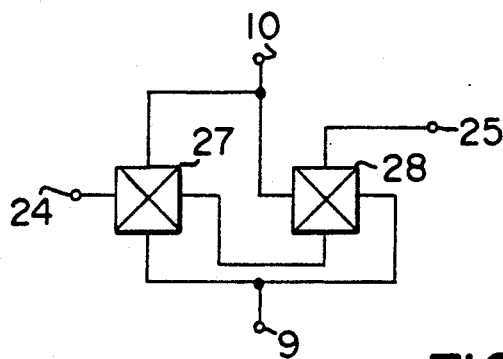
FIG. 3 is a circuit diagram of an embodiment of a configuration of Hall generators according to the invention.

Furthermore, according to another feature of the invention, one of the two Hall generators of each of the Hall sensors 1, 2 is rotated by 90° relative to the other. In FIG. 3 of the drawing, the configuration of two Hall generators 27, 28 which are rotated by 90° relative to one another is shown in detail. However, for the sake of simplicity, no voltage/current converters are shown in FIG. 3. Therefore, instead of an addition of signal currents as in FIG. 2, a series circuit of the Hall signal paths and the resultant addition of signal voltages is shown. The result is two terminals 24, 25, at which the Hall signal is present. Two further terminals 9, 10 are provided for impressing the common control current or the common control voltage, and the Hall control paths of the two Hall generators are connected in parallel. The advantage of a 90° rotated configuration of Hall generators is that it compensates for disturbing piezoelectric effects in a Hall sensor, such as resulting from mechanical strains.

In a further feature of the invention, as shown in FIG. 2, the high-pass filter 20 is connected to the output side of the four voltage/current converters 16, 17, 18, 19. A high-pass filter advantageously suppresses undesirable direct components, such as offset voltages and low-frequency disturbance signals. Furthermore, with suitable dimensioning, rotational speeds below a predetermined minimum rpm are not detected by the circuit configuration.

Figure 4:
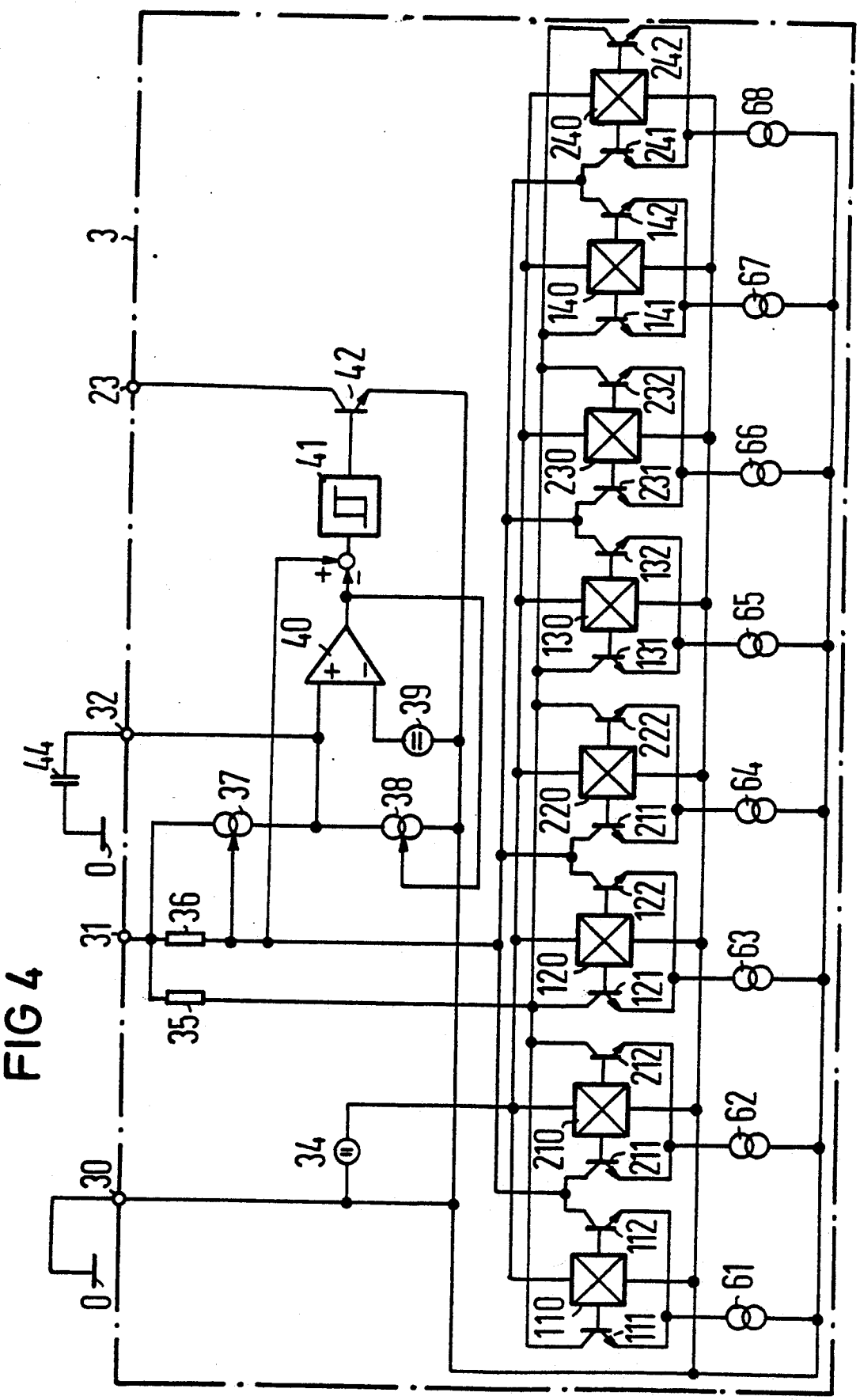
FIG. 4 is a schematic circuit diagram of an embodiment of a configuration according to the invention having a differential amplifier and an evaluation circuit.

In the embodiment of FIG. 4, four Hall generators 110, 120, 130, 140 and 210, 220, 230, 240 are provided for each of the two Hall sensors 1, 2 of FIG. 2. The Hall generators 110, 120, 130, 140 form one Hall sensor 1, and the Hall generators 210, 220, 230, 240 form the other Hall sensor 2. The voltage/current converters 16, 17, 18, 19 of the circuit configuration of FIG. 2 are constructed as differential amplifiers, each including transistors 111, 112, 121, 122, 131, 132, 141, 142, 211, 212, 221, 222, 231, 232, 241, 242. The emitters of the transistors of the differential amplifiers are each connected to current impressing means 61, 62-68. Output branches including two load resistors 35, 36 are common to all of the differential amplifiers, and one output branch is furthermore connected to the control input of first controllable current impressing means 37. The collectors of the differential amplifier transistors are coupled to the output branches in such a way that signal currents of the same phase relation, which originate in the differential amplifier transistors 110, 120, 130, 140 of the first Hall sensor are added up, while those that originate in the differential amplifier transistors 210, 220, 230, 240 of the other Hall sensor are subtracted. Thus the signal currents of the transistor circuits 111, 212, 121, 222, 132, 232, 141 are added together in the output branch of the load resistor 35, while the signal currents of the transistor branches 112, 211, 122, 221, 132, 231, 142, 241 are added up in the opposed phase output circuit of the load resistor 36. Thus the output signals at the Hall paths of the Hall generators 110, 120, 130, 140 and of the Hall generators 210, 220, 230, 240 are added or subtracted respectively, because the signal currents of the differential amplifiers, in the respective common load resistors 35, 36, are added up with the same or opposed relation. Since the collector currents of a transistor are practically impressed, because of the very high output impedance to be measured at the collector, the addition of the collector currents is attained substantially without mutual feedback, simply by connecting the corresponding collectors to the load resistors 35 and 36. All of the Hall generators are supplied in common in parallel operation from a trigger voltage source 34. It is suitable to impress a voltage, in order to compensate for different offset variables and temperature dependencies of the Hall generators.

The output circuit of the controllable current impressing means 37 is connected to the non-inverting input of an operational amplifier 40 and to a supply potential present at a connection terminal 31. The inverting input of the operational amplifier 40 is kept at a reference potential by a reference voltage source 39. The non-inverting input of the operational amplifier 40 is moreover carried to zero potential 0. This occurs first through a connection terminal 30 and further current impressing means 38 triggered by the output of the operational amplifier 40, and second through a connection terminal 32 and a capacitor 44 disposed outside the integrated circuit 3. The signal at the output of the operational amplifier 40 and the signal at the load resistor 36 are carried, in phase opposition to one another, to the input of a comparator 41 with hysteresis, which in turn has an output connected to an amplifier stage 42 for increasing the current at the output 23 of the integrated circuit 3. The direct voltage component generated by the reference voltage source 39 and superimposed on the signal at the output of the operational amplifier 40 serves as a switch threshold for the comparator 41 with hysteresis. The circuit configuration shown, which is formed of the two controlled current impressing means 37 and 38, the reference voltage source 39, the capacitor 44 and the operational amplifier 40, represents a first-order high-pass filter according to a further feature of the invention. The advantages of this embodiment of a high-pass filter are that only one additional connection terminal 32 is required for limit frequency setting with the capacitor 44, since the connection terminal 30 carrying the zero potential 0, which is present in any case, is used as the second terminal for the capacitor 44. Another advantage is that as compared with known configurations, such as that of German Published, Non-Prosecuted Patent Application 32 31 391, the frequency-determining capacitor 44 does not need to have such high capacitance.

According to a feature of the invention, both the exemplary embodiment of FIG. 2 and that of FIG. 4 are made by integrated circuitry technology. This has the advantage of a lower production cost and greater reliability. Moreover, as already described for FIG. 3, it is advantageous in the exemplary embodiment of FIG. 4 to rotate the Hall generators through 90° relative to one another, in order to suppress disturbance variables caused by mechanical strains and based on the piezoelectric effect.

From the exemplary embodiments described above, it will be understood that in a circuit configuration according to the invention, both disturbance variables acting upon the two Hall sensors from outside, such as temperature fluctuation or noise fields, and disturbance variables originating in the Hall sensors themselves, such as piezoelectric effects, noise, offset drift or offset straying, are suppressed to an increased extent, while the useful signal is virtually doubled. The result is better evaluatability of the useful signal, and the analysis of smaller signals becomes possible, as is the case, for instance, if there is a relatively large distance between the gear wheel and the Hall sensor.

We claim:

1. Circuit configuration for contactless detection of the rpm of a rotating gear wheel, comprising two identical firmly mounted and magnetically prestressed Hall sensors, wherein the teeth of the gear wheel of which the rpm is to be detected, are mutually spaced apart by a center distance equal to twice the center distance between the Hall sensors, each of said Hall sensors including at least one pair of identical Hall generators having a driving signal input and a signal output, said driving signal input being driven with an impressed control current or impressed control voltage, voltage/current converters each with inputs and outputs, each input being coupled to a signal output of a respective one of said Hall generators, and an evaluation circuit including a high-pass filter with an input and an output, and a comparator with switching hysteresis having an input and an output, wherein the outputs of said voltage/current converters, whose inputs are connected to one of said Hall sensors and the outputs of said voltage-current converters, whose inputs are connected to the other one of said Hall sensors are linked together in phase opposition, and are connected to the input of said high-pass filter, the output of said high-pass filter being connected to said input of said comparator, wherein said high-pass filter includes an operational amplifier having an inverting input, a non-inverting input and an output, a reference voltage source connecting the inverting input to zero potential, two controllable current sources, the first of said controllable current sources being connected between a supply potential and the non-inverting input of said operational amplifier, the second of said controllable current sources being connected between zero potential and said non-inverting input of said operational amplifier, the first of said current sources being controlled by an output signal of said voltage/current converters, the second of said current sources being controlled by a signal present at the output of said operational amplifier, a capacitor connected between the non-inverting input of said operational amplifier and the zero potential, and the difference between the signal at the output of said operational amplifier and the output signal of said voltage/current converters forming an output signal of said high-pass filter.

2. Circuit according to claim 1, wherein said Hall generators of each of said Hall sensors are rotated through 90° relative to each another.

3. Circuit according to claim 1, wherein said voltage/current converters are differential amplifiers with output branches carrying signal currents of opposed phase relation, each input of said differential amplifier being connected to the signal output of said Hall generators, and the output branches of said differential amplifiers of one of said Hall sensors carrying signal currents of the same phase relation and the output branches of said differential amplifiers of the other of said Hall sensors carrying signal currents of opposed phase relation being joined together and connected to said evaluation circuit.

4. Circuit according to claim 1, including a trigger circuit with an output of said output of said trigger circuit being connected to said driving signal inputs of said Hall generators, said Hall sensors, said evaluation circuit and said trigger circuit being joined together into an integrated circuit.

* * * * *